United States Patent
Shibazaki (10) Patent No.: US 8,866,982 B2
(45) Date of Patent: Oct. 21, 2014

(54) DISPLAY DEVICE

(75) Inventor: Minoru Shibazaki, Chu-Nan (TW)

(73) Assignee: Innolux Corporation, Chu-Nan (TW)

( * ) Notice: Subject to any disclaimer, the term of this patent is extended or adjusted under 35 U.S.C. 154(b) by 694 days.

(21) Appl. No.: 12/839,322

(22) Filed: Jul. 19, 2010

(65) Prior Publication Data

US 2011/0043440 A1 Feb. 24, 2011

Related U.S. Application Data (60) Provisional application No. 61/235,683, filed on Aug. 20, 2009, provisional application No. 61/247,079, filed on Sep. 30, 2009.

(51) Int. Cl.
*G02F 1/1343* (2006.01)
*G02F 1/1362* (2006.01)

(52) U.S. Cl.
CPC .................. *G02F 1/136213* (2013.01)
USPC ............................... 349/39; 349/38

(58) Field of Classification Search
USPC .............................. 349/38–39, 141
See application file for complete search history.

(56) References Cited

U.S. PATENT DOCUMENTS

| | | | | |
|---|---|---|---|---|
| 7,084,848 B2* | 8/2006 | Senda et al. | | 345/92 |
| 7,733,430 B2* | 6/2010 | Huang et al. | | 349/38 |
| 7,821,606 B2* | 10/2010 | Ogino | | 349/141 |
| 8,325,305 B2* | 12/2012 | You et al. | | 349/129 |
| 2002/0191123 A1* | 12/2002 | Deane | | 349/43 |
| 2004/0095539 A1* | 5/2004 | Lee et al. | | 349/129 |
| 2007/0126969 A1* | 6/2007 | Kimura et al. | | 349/141 |
| 2008/0030636 A1* | 2/2008 | Huang et al. | | 349/38 |
| 2010/0002162 A1* | 1/2010 | Morimoto et al. | | 349/38 |

FOREIGN PATENT DOCUMENTS

| | | |
|---|---|---|
| CN | 101211083 | 7/2008 |
| JP | 06-148684 | 5/1994 |
| JP | 08-043854 | 2/1996 |
| JP | 08-254715 | 10/1996 |
| JP | 11-311805 | 11/1999 |
| JP | 2001-056485 | 2/2001 |

* cited by examiner

*Primary Examiner* — Bumsuk Won
*Assistant Examiner* — Charles Chang
(74) *Attorney, Agent, or Firm* — Liu & Liu (57) ABSTRACT

A display device is disclosed. According to the present invention, the display device comprises a bottom substrate, a plurality of interlayers, a first passivation layer, a bottom electrode, a second passivation layer, a top electrode and a top substrate. The interlayers are formed on the bottom substrate, including a patterned polysilicon layer, a data line and a gate line disposed therein. The first passivation layer is formed on the interlayers. The bottom electrode is formed on the first passivation layer. The second passivation layer is formed to cover the bottom electrode. The top electrode is formed on the second passivation layer at a position corresponding to the bottom electrode to form a storage capacitance.

15 Claims, 8 Drawing Sheets

DISPLAY DEVICE

CROSS REFERENCE TO RELATED APPLICATION

This application claims the benefit of U.S. Provisional Patent Application Ser. No. 61/235,683, filed Aug. 20, 2009 and Provisional Patent Application Ser. No. 61/247,079, filed Sep. 30, 2009.

BACKGROUND OF THE INVENTION

1. Field of the Invention

The present invention generally relates to a display device, and more particularly to a liquid crystal display device with high transmittance, less flicker.

2. Description of Prior Art

Flicker is a visual defect to an AMLCD (Active Matrix Liquid Crystal Display) which has already been led a great concern in the related industry field. Various kinds of solutions have proposed to minimize the flicker phenomenon occurring on a liquid crystal display. For example, voltage adjustment, flicker compensation circuit design, gate R-C loading degradation, Cst (storage capacitance) compensation, and etc. Among those solutions, the Cst compensation can be a major choice for the manufacturers of liquid crystal display in general.

Figure 1:
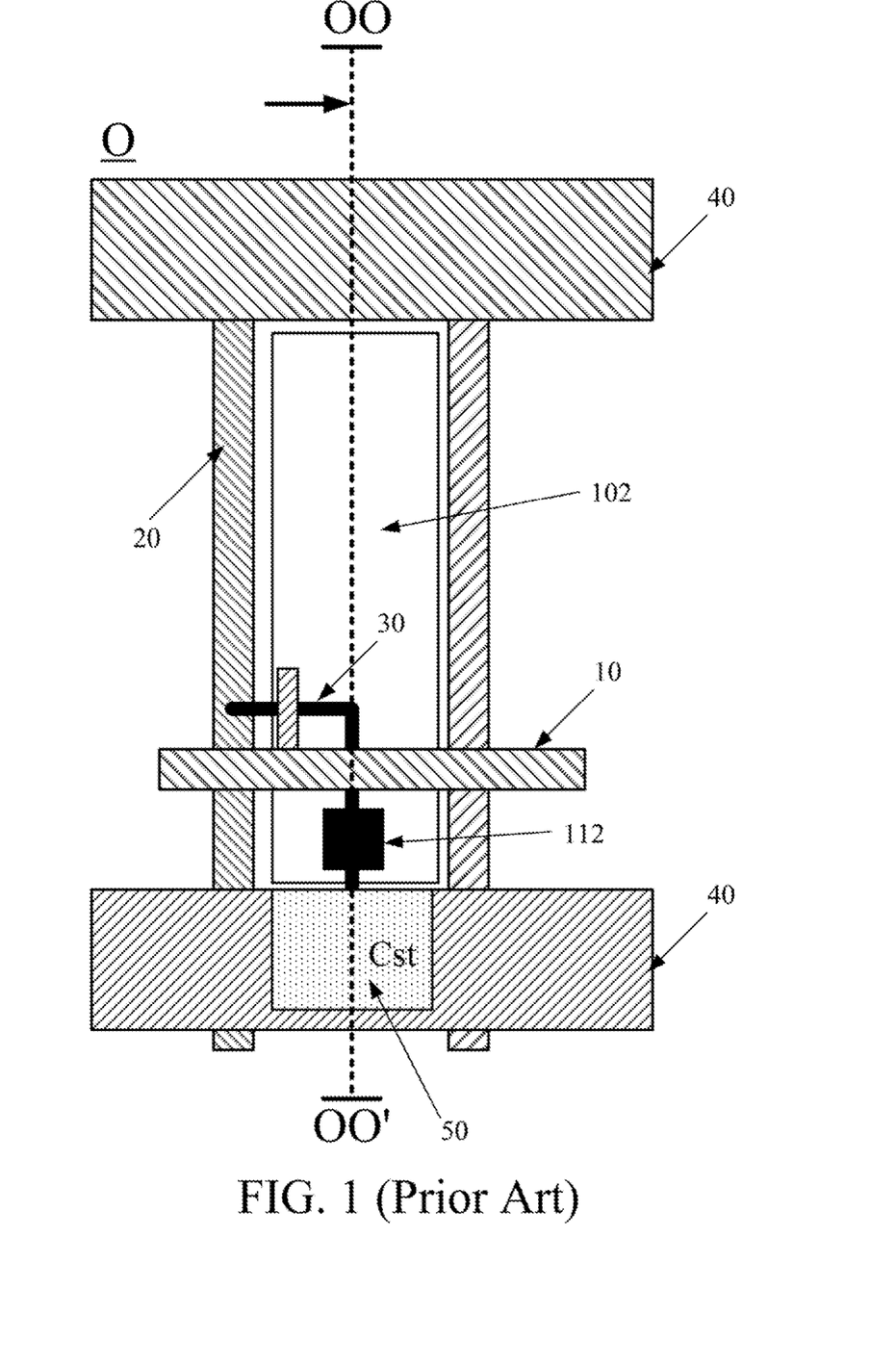
FIG. 1 depicts a simple conventional structure top view diagram of a pixel unit according to prior art.

Please refer to FIG. 1, which depicts a top view of a simple conventional structure of a pixel unit O according to prior art. As shown in FIG. 1, a pixel unit O includes a gate line 10, a data line 20, a polysilicon layer 30 as an active channel region of a TFT (Thin Film Transistor) of the pixel unit O, a Cst (storage capacitance) line 40 and a Cst (storage capacitance) 50. The Cst (storage capacitance) 50 is formed between the polysilicon layer 30 and the Cst (storage capacitance) line 40. The pixel unit O further includes a top ITO (Indium Tin Oxide) 102, and a contact hole 112. All aforesaid elements respectively have generally well known functions and occupy certain areas of the pixel unit O.

Figure 2:
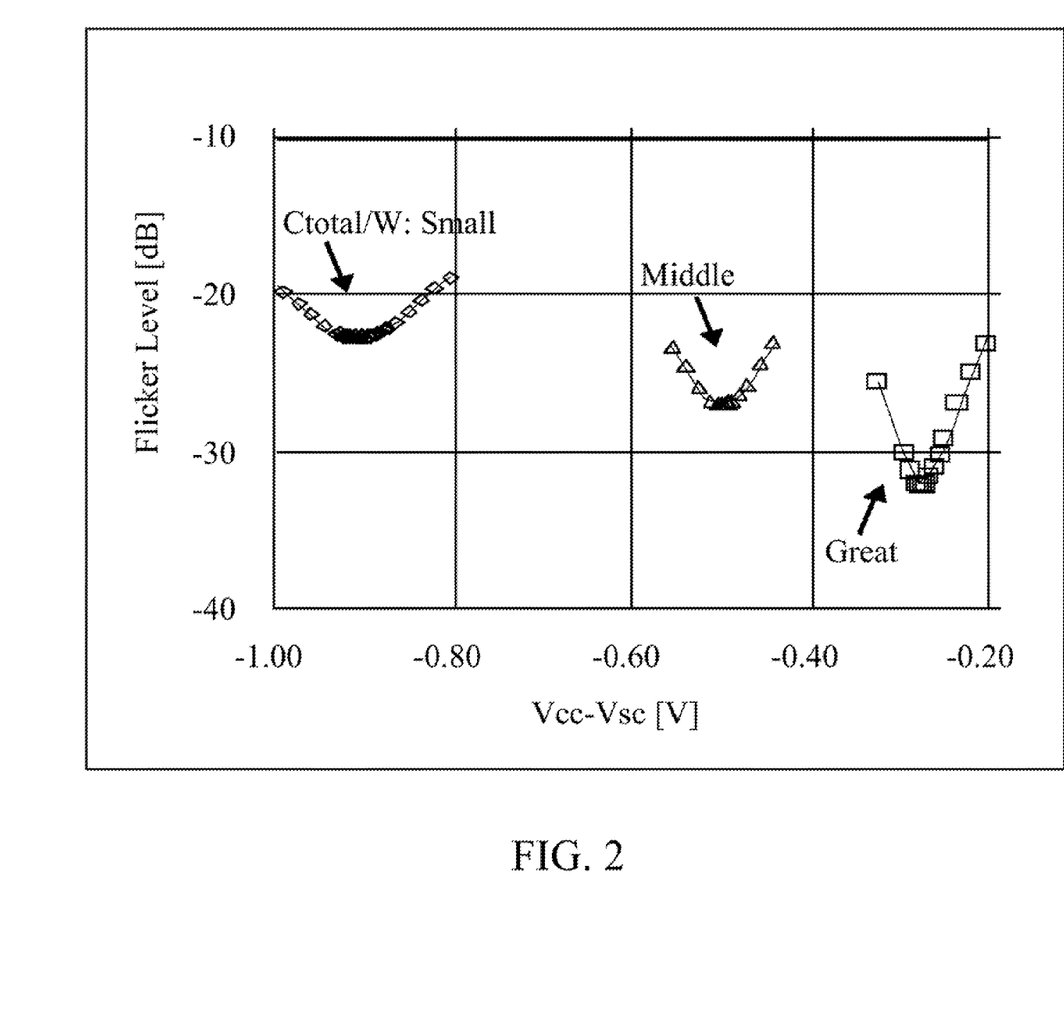
FIG. 2 shows a relationship diagram of a flicker decibel value and a voltage difference between Vsc and Vcc of a liquid crystal display.
Figure 3:
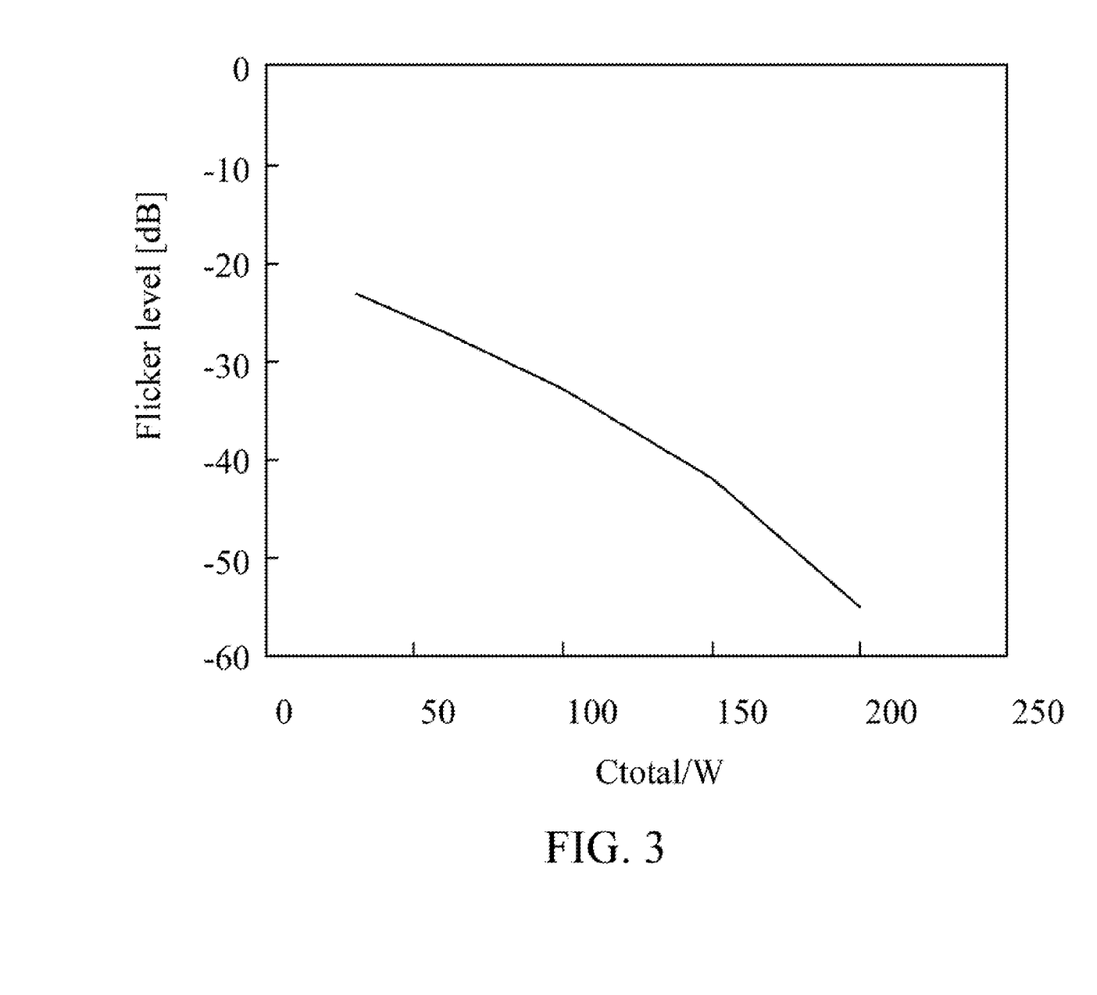
FIG. 3 shows a relationship diagram of a flicker decibel value and a total storage capacitance/a gate width ratio (Ctotal/W) of a liquid crystal display.

Please refer to FIG. 2 and FIG. 3. FIG. 2 shows a diagram showing relationship between a flicker level denoted in decibel value and a voltage difference between Vsc and Vcc of a liquid crystal display. Vcc represents a supply voltage to the liquid crystal display. Vsc represents a storage capacitance voltage to the liquid crystal display. As shown in FIG. 2, small, middle and great total storage capacitance/a gate width ratios (Ctotal/W) are shown, when a greater total storage capacitance/a gate width ratio (Ctotal/W) is adopted, the flicker level becomes lower and the flicker is reduced. FIG. 3 shows a relationship diagram of a flicker decibel value and a total storage capacitance/a gate width ratio (Ctotal/W) of a liquid crystal display. Apparently, the flicker level becomes smaller and therefore the flicker can be reduced as the Ctotal/W becomes greater. Ctotal is a sum of Clc (capacitance of the liquid crystal) plus Cst and W is the gate width.

In the foregoing Cst compensation solution for reducing the flicker, a larger Ctotal value is preferred and a large Cst area is required in order to minimize the flicker phenomenon. However, similar to the gate line 10 and the data line 20, the Cst line 40 is generally made by metal material. Unlike the top ITO 102 which is transparent as well known and is employed as the pixel electrode of the pixel unit O, the Cst line 40 is not transparent so the light cannot penetrate therethrough. Accordingly, when the Cst area is enlarged to minimize the flicker phenomenon, the transmittance of the whole liquid crystal display unavoidably becomes low.

In related manufacturing industries today, there is a need to develop a better solution for resolving the aforesaid problem, consequently.

SUMMARY OF THE INVENTION

According to the present invention, a display device with high transmittance, less flicker is provided.

The display device according to the present invention has multiple pixels. Each pixel comprises a bottom substrate, a plurality of interlayers, a first passivation layer, a bottom electrode, a second passivation layer, a top electrode, and a top substrate. The interlayers are formed on the bottom substrate, including a patterned polysilicon layer, a data line and a gate line disposed therein. The first passivation layer is formed on the interlayers. The bottom electrode is formed on the first passivation layer. The second passivation layer is formed to cover the bottom electrode. The top electrode is formed on the second passivation layer at a position corresponding to the bottom electrode to form a storage capacitance.

Furthermore, the top substrate is positioned on a top side of the display device. A common electrode is formed on an under surface of the top substrate. A liquid crystal layer is sandwiched by the top electrode and the common electrode, wherein the top electrode is employed as a pixel electrode of the display device. Significantly, the bottom electrode is also transparent and can be formed by the same material as the top electrode, such as ITO. The bottom electrode is coupled with the common electrode. Therefore, the Cst line in accordance with prior art which is not transparent can be omitted. A display device with high transmittance, less flicker can be realized.

DETAILED DESCRIPTION OF THE INVENTION

Figure 4:
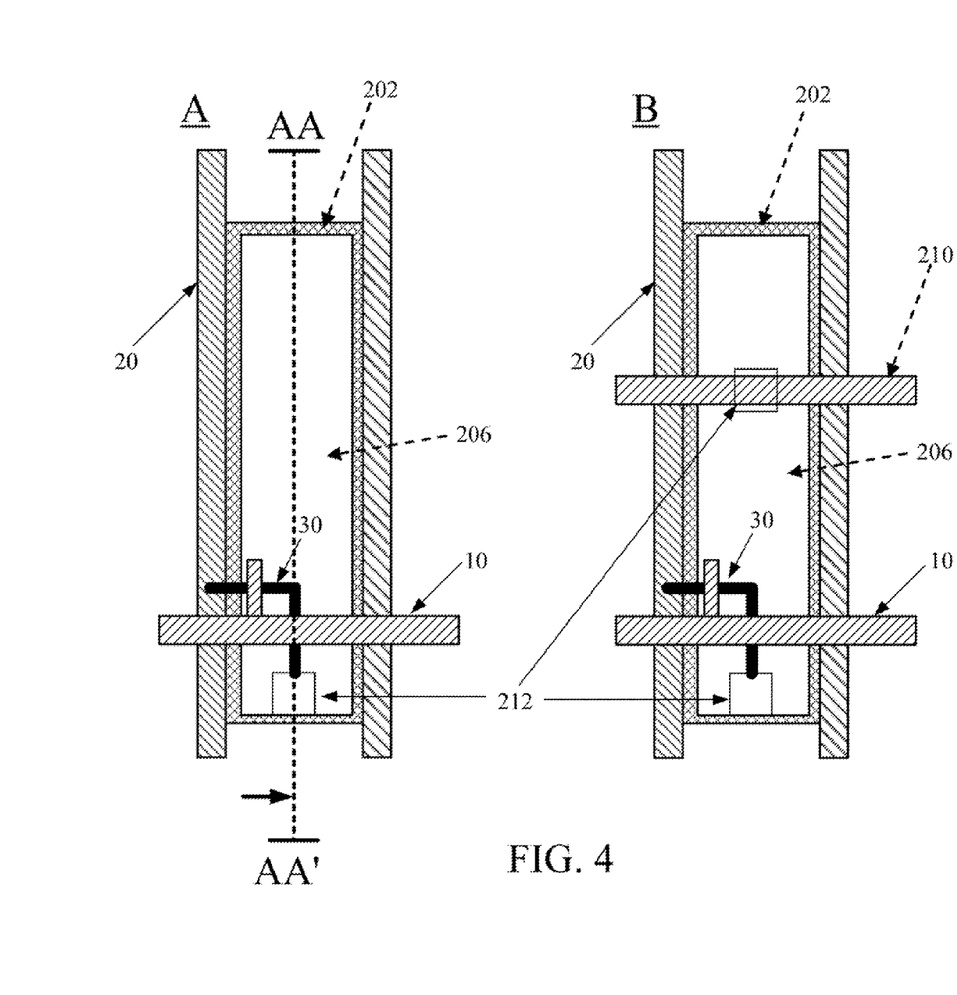
FIG. 4 depicts simple structure top view diagrams of pixel units according to the present invention.

Please refer to FIG. 4, which depicts a simple structure top view diagram of pixel units A, B according to the present invention. In the following embodiments, a liquid crystal display is illustrated as a display device of the present invention. The pixel unit A of the liquid crystal display in accordance with the present invention comprises a gate line 10, a data line 20, a polysilicon layer (p-Si) 30 is patterned as an active channel region of a TFT (Thin Film Transistor), a bottom electrode 202, a top electrode 206 and at least one contact hole 212. A storage capacitance Cst 208 according to the present invention is formed by the bottom electrode 202 and the top electrode 206 (details will be introduced later). Therefore, a Cst line such as the Cst line 40 of the prior art (see FIG. 1) is not required and can be selectively omitted as shown in the pixel unit A of FIG. 4.

Alternatively, a Cst line 210 also can be formed as shown in the pixel unit B of FIG. 4 according to the present invention. However, in this embodiment, it is not necessary that the width of the Cst line 210 has to be as large as the Cst line 40 of the prior art so as to make the Cst 50 large enough (see FIG. 1). Therefore, the width of the Cst line 210 according to the present invention can be equal to or even less than the width of the gate line 10 or the data line 20 since the storage capacitance Cst according to the present invention is formed by the bottom electrode 202 and the top electrode 206 and the Cst line 210 can not have to be as large as the Cst line 40 of the prior art to make the Cst 50 large enough for reducing the flicker compensation.

Figure 5A:
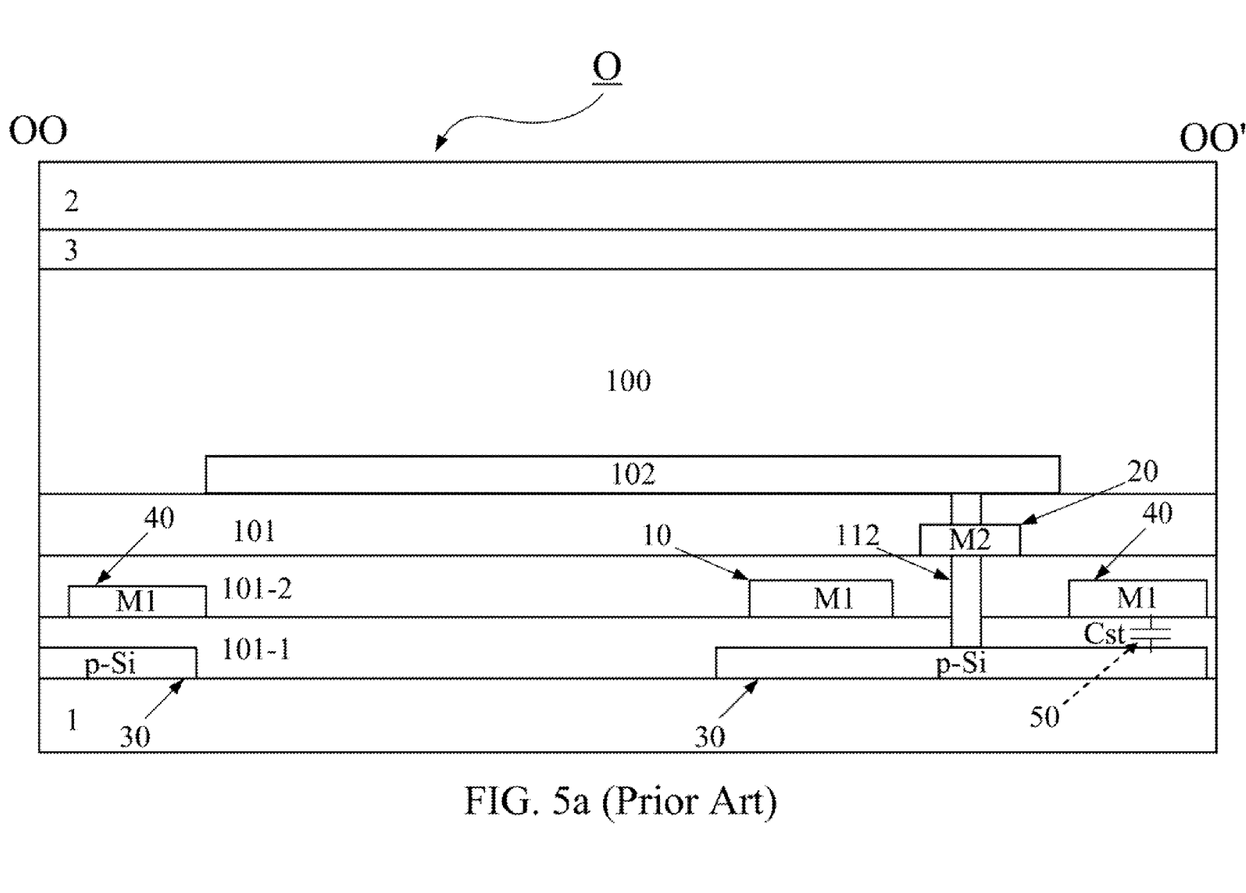
FIG. 5a depicts a sectional structure diagram of the pixel unit along OO-OO' line of FIG. 1 according to prior art.
Figure 5B:
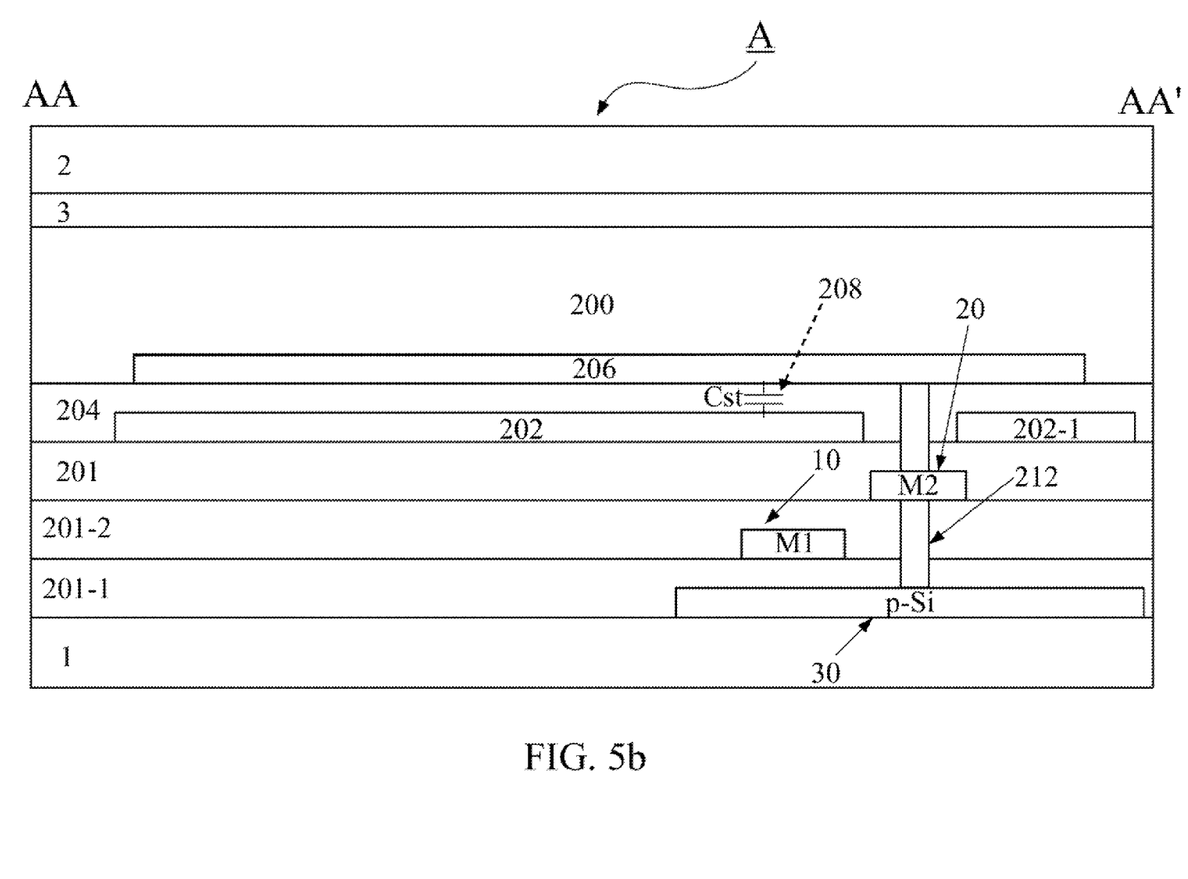
FIG. 5b depicts a sectional structure diagram of the pixel unit along AA-AA' line of FIG. 4 according to the present invention.

Please refer to FIG. 5a, FIG. 5b with FIG. 1 and FIG. 4 together. FIG. 5a is a sectional structure diagram depicting the pixel unit O along OO-OO' line of FIG. 1 according to prior art. FIG. 5b is a sectional structure diagram depicting the pixel unit A along AA-AA' line of FIG. 4 according to the present invention. According to prior art, the pixel unit O of the liquid crystal display comprises a bottom substrate 1, a top substrate 2, a liquid crystal layer 100 disposed between the bottom and top substrates 1 and 2. On the bottom substrate 1, a plurality of interlayers are formed. The interlayers include a patterned polysilicon (p-Si) layer 30 as the active channel region of the TFT of the pixel unit O, a passivation layer 101-1 covering the patterned p-Si layer 30, a patterned metal layer M1 (such as gate line 10 and Cst line 40) formed on the passivation layer 101-1, another passivation layer 101-2 covering the patterned metal layer M1, and another patterned metal layer M2 formed on the passivation layer 101-2. A passivation layer 101 is formed on the interlayers, and then a top electrode 102 is formed on a specific position of the passivation layer 101. The top electrode 102 is employed as a pixel electrode of the pixel unit O. The top electrode 102 and a common electrode 3 sandwich the liquid crystal layer 100. The common electrode 3 is formed on an under surface of the top substrate 2 and overlapped with the top electrode 102. However, the passivation layer 101 can be defined as a passivation layer covering the patterned metal layer M2 (such as data line 20 shown in FIG. 4).

As shown in FIG. 5a, the Cst line 40 is formed in the same layer as the gate line 10 and the Cst (storage capacitance) 50 is formed by the polysilicon layer 30 and the Cst line 40 in the pixel unit O according to prior art. As aforementioned, as the gate line 10, the data line 20, the Cst line 40 are generally made by metal material which is not transparent. In this embodiment, the gate line 10 and the Cst line 40 are formed by the same metal material M1. The light cannot penetrate through the Cst line 40.

According to the present invention, the pixel unit A of the liquid crystal display shown in FIG. 5b comprises a bottom substrate 1, a top substrate 2, a liquid crystal layer 200 disposed between the bottom and top substrates 1 and 2. On the bottom substrate 1, there are a plurality of interlayers including a patterned polysilicon (p-Si) layer 30 as the active channel region of the TFT of the pixel unit A, a passivation layer 201-1 covering the patterned p-Si layer 30, a patterned metal layer M1 (such as gate line 10) formed on the passivation layer 201-1, another passivation layer 201-2 covering the patterned metal layer M1, and another patterned metal layer M2 formed on the passivation layer 201-2. A passivation layer 201 is formed on the interlayers to cover the patterned metal layer M2.

As shown in FIG. 5b, the pixel unit A of the liquid crystal display in accordance with the present invention further comprises a bottom electrode 202. The bottom electrode 202 is formed on a specific position of the passivation layer 201 and is covered by the passivation layer 204. The top electrode 206 is formed on the passivation layer 204 at a position corresponding to the bottom electrode 202. Apparently, the bottom electrode 202 is not formed in the same layer of the gate line 10 of the liquid crystal display. The top electrode 206 is employed as a pixel electrode of the pixel unit A. The contact hole 212 is utilized to connect the polysilicon layer (p-Si) 30 and the top electrode 206. A top substrate 2 is positioned on a top side of the liquid crystal display. A common electrode 3 is formed on an under surface of the top substrate 2 and overlapped with the bottom electrode 202 and the top electrode 206. The liquid crystal layer 200 is sandwiched by the top electrode 206 and the common electrode 3 of the liquid crystal display.

Figure 7:
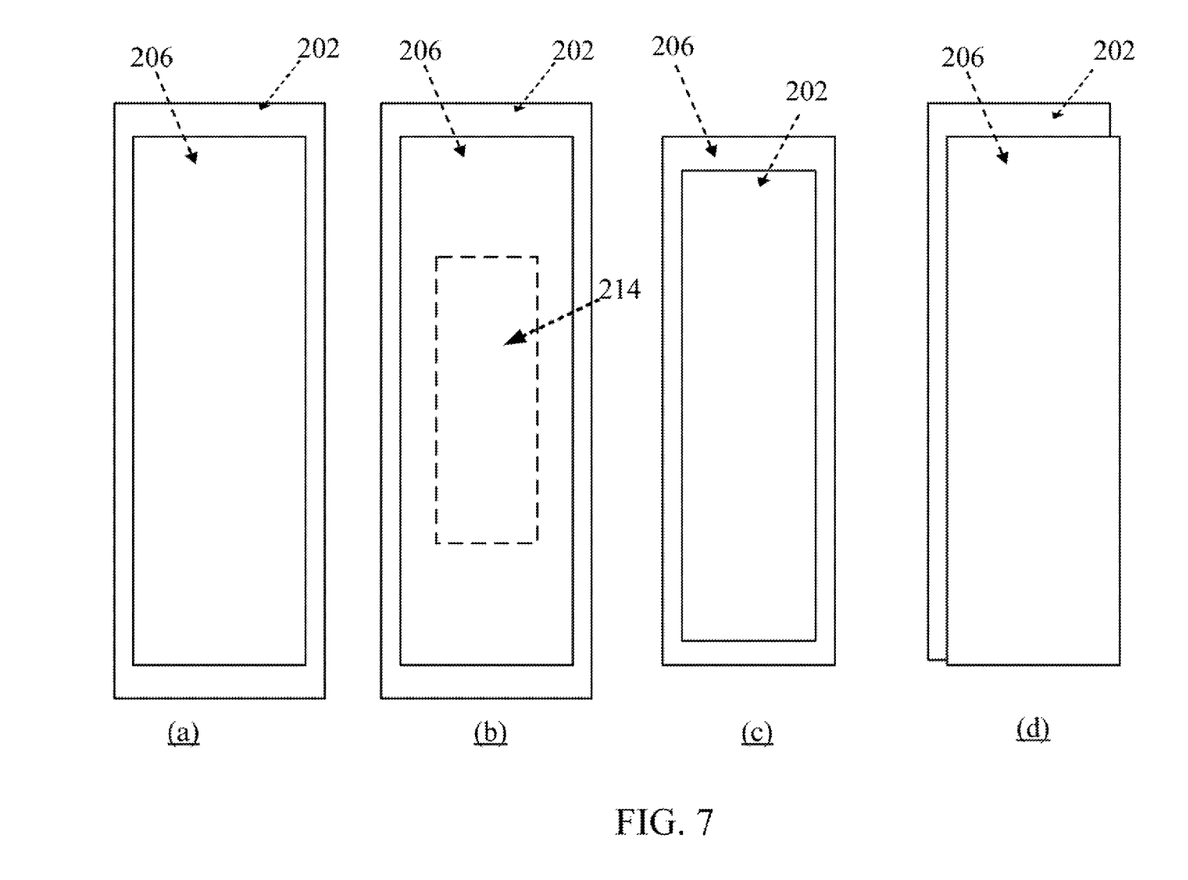
FIG. 7(a)~FIG. 7(d) show four embodiments of position relations between top and bottom electrodes in the pixel unit according to the present invention.

Significantly, the Cst (storage capacitance) 208 is formed by the bottom electrode 202 and the top electrode 206. That is, the Cst 208 is formed between the bottom electrode 202 and the top electrode 206 according to the present invention. The specific position of the bottom electrode 202 and the position of the top electrode 206 can be predeterminedly designed for corresponding to each other and formed larger to make the Cst 208 large enough and to realize the liquid crystal display with high transmittance, less flicker. Several embodiments of position relations between the bottom electrode 202 and the top electrode 206 corresponding to each other are simply introduced in FIG. 7 The bottom electrode 202 and the top electrode 206 are both formed by transparent material, such as ITO. The bottom electrode 202 can be coupled with the common electrode 3. As aforementioned, the Cst line 40 of the prior art can be selectively omitted.

Figure 6:
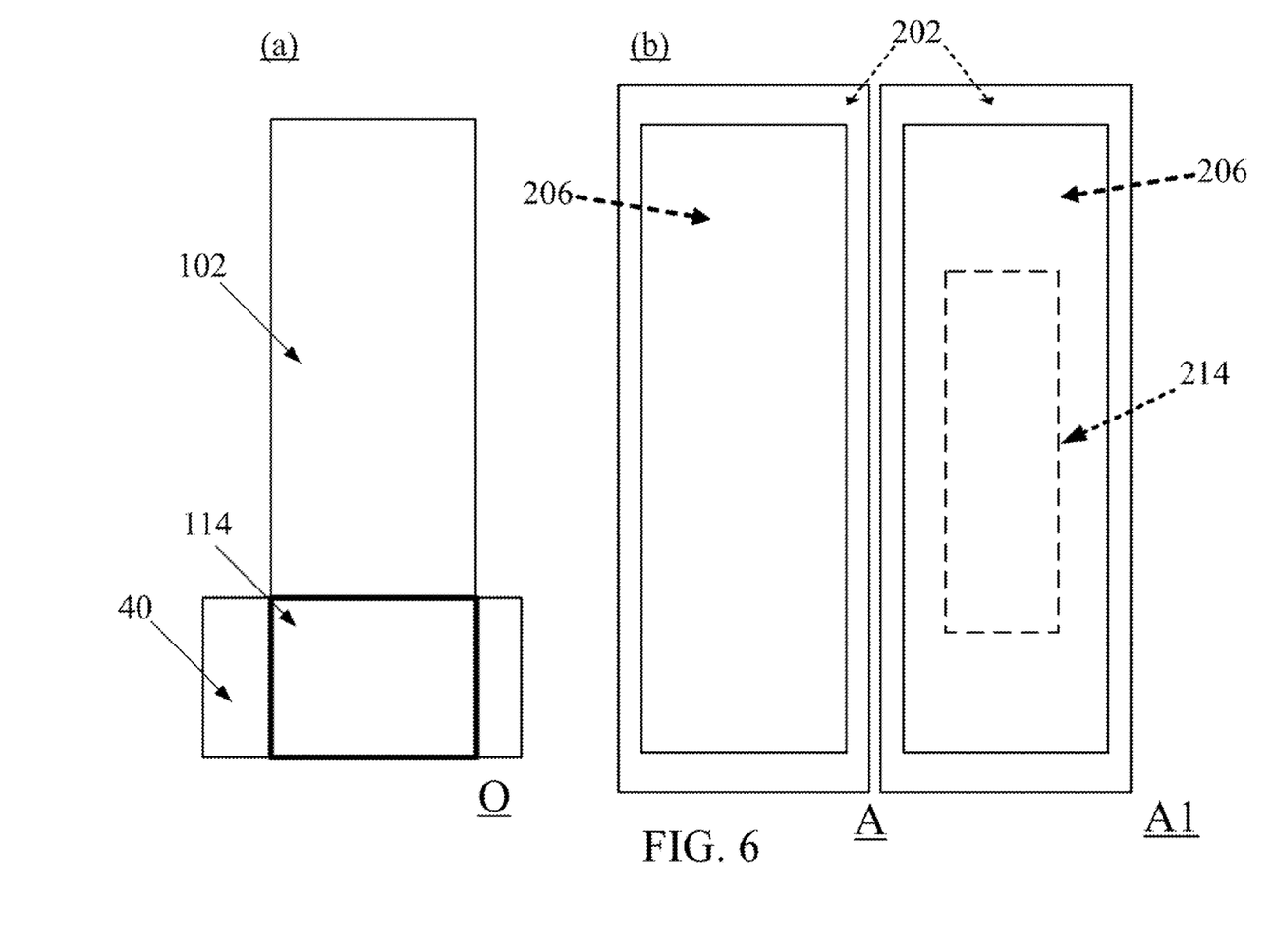
FIG. 6(a) shows an occupied area diagram of Cst line, top electrode in the pixel unit according to prior art.
FIG. 6(b) shows an occupied area diagram of top and bottom electrodes in the pixel unit according to the present invention.

Please refer to FIG. 6(a), FIG. 6(b) with FIG. 1 and FIG. 4. FIGS. 6(a) and (b) are schematic diagrams showing occupied areas of Cst line, top and bottom electrodes in the pixel units O, A and A1 according to prior art and according to the present invention. As mentioned, in the conventional pixel unit O shown in FIG. 6(a), the Cst line 40 is formed by the metal material which is not transparent. Even the top electrode 102 is formed by the transparent ITO material, the light still cannot pass through the occupied area of the Cst line 40. As considering the transmittance of the liquid crystal display, the overlapped area of the Cst line 40 and the top electrode 102 becomes a wasted zone 114. On the contrary, in the present invention as shown in FIG. 6(b), the bottom and the top electrode 202, 206 of the pixel unit A or pixel unit A1 for forming the Cst are both formed by the transparent material, such as ITO. Alternatively, the bottom electrode 202 is formed as a frame with an opening 214 for the pixel unit A1 shown in FIG. 6(b). In both of the pixel units A and A1, a transmissive area even larger than the conventional pixel unit O in FIG. 6(a) can be obtained to improve the transmittance of the liquid crystal display and gain more storage capacitance. The improvement of the transmittance can even be greater than 40%.

Furthermore, please refer to FIG. 2 and FIG. 3 again. To reduce flicker, a total storage capacitance/a gate width ratio (Ctotal/W) of a liquid crystal display can be greater than 150 according to the experiments done by the inventor. According to the present invention, even if the Cst area is enlarged for minimizing the flicker phenomenon, sufficient transmittance of the liquid crystal display still can be remained.

Please refer to FIG. 7(a)~FIG. 7(d), which show four embodiments of position relations between top and bottom electrodes in the pixel unit according to the present invention. As shown in FIG. 7(a)~FIG. 7(d), the design concept for the position relations between the bottom electrode 202 and the top electrode 206 is introduced. As aforementioned in FIG. 5b, the bottom electrode 202 is formed on a specific position of the passivation layer 201 and then is covered by the passivation layer 204. Thereafter, the top electrode 206 is formed on the passivation layer 204 at a position corresponding to the bottom electrode 202. The position of the bottom electrode 202 and the position of the top electrode 206 can map with each other in principle. Accordingly, hereafters are the embodiments of the mapping between the bottom electrode 202 and the top electrode 206 are illustrated. In FIG. 7(a), the bottom electrode 202 is larger than the top electrode 206 in centrally mapping. In FIG. 7(b), the bottom electrode 202 is larger than the top electrode 206 in centrally mapping but formed as a frame with an opening 214. In FIG. 7(c), the bottom electrode 202 is smaller than the top electrode 206 in centrally mapping. In FIG. 7(d), the bottom electrode 202, the top electrode 206 are equal in size but horizontally shifted in positions. Principally, the mapping (position relation) between the bottom electrode 202 and the top electrode 206 can be arbitrarily designed as long as the bottom electrode 202 and the top electrode 206 partially overlap with each other at least.

Consequently, according to the present invention, it can be realized to improve the flicker phenomenon and still maintain the transmittance of the liquid crystal display.

The liquid crystal display of the present invention can be employed in a mobile phone, a digital camera, a personal digital assistance, a notebook, a laptop computer, a television, an in-vehicle display, a global positioning system, a flight display, a digital photo frame or a portable DVD player.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A display device having multiple pixel units, each pixel unit comprising:
   a bottom substrate;
   a plurality of interlayers formed on the bottom substrate, the interlayers including a patterned polysilicon layer, a data line and a gate line disposed therein;
   a first passivation layer formed on the interlayers;
   a bottom electrode formed on the first passivation layer;
   a second passivation layer, formed to cover the bottom electrode;
   a top electrode, formed on the second passivation layer at a position corresponding to the bottom electrode to form a storage capacitance, wherein the bottom electrode is larger than the top electrode;
   a storage capacitance line formed across the pixel unit;
   a top substrate, positioned on a top side of the display device;
   a common electrode, formed on an under surface of the top substrate; and
   a liquid crystal layer, sandwiched by the top electrode and the common electrode, wherein a ratio of a total capacitance and a gate width of the pixel unit is larger than 150, wherein the total capacitance is sum of a liquid crystal layer capacitance and a storage capacitance of the pixel unit, and wherein a flicker level of the display device is less than −40 dB.

2. The display device of claim 1, wherein the bottom electrode is transparent.

3. The display device of claim 2, wherein the bottom electrode is formed by ITO.

4. The display device of claim 1, wherein the bottom electrode is coupled with the common electrode.

5. The display device of claim 1, wherein a width of the storage capacitance line is less than or equal to a width of the gate line.

6. The display device of claim 1, wherein a width of the storage capacitance line is less than or equal to a width of the data line.

7. The display device of claim 1, wherein the bottom electrode and the gate line of the display device are formed in different layers of the display device.

8. The display device of claim 1, wherein the display device is employed in a mobile phone, a digital camera, a personal digital assistance, a notebook, a laptop computer, a television, an in-vehicle display, a global positioning system, a flight display, a digital photo frame or a portable DVD player.

9. The display device of claim 1, wherein the storage capacitance line is formed across the top electrode and the bottom electrode.

10. The display device of claim 9, wherein the storage capacitance line is formed across the top electrode and the bottom electrode at a location away from perimeters of the top electrode and the bottom electrode.

11. The display device of claim 5, wherein the storage capacitance line is formed across the top electrode and the bottom electrode at a location not overlapping perimeters of the top electrode and the bottom electrode on either side of the storage capacitance line.

12. The display device of claim 6, wherein the storage capacitance line is formed across the top electrode and the bottom electrode at a location not overlapping perimeters of the top electrode and the bottom electrode on either side of the storage capacitance line.

13. The display device of claim 1, wherein the bottom electrode and the top electrode are in centrally mapping.

14. A display device having multiple pixel units, each pixel unit comprising:
   a bottom substrate;
   a plurality of interlayers formed on the bottom substrate, the interlayers including a patterned polysilicon layer, a data line, and a gate line disposed therein;
   a first passivation layer formed on the interlayers;
   a bottom electrode formed on the first passivation layer;
   a second passivation layer formed to cover the bottom electrode;
   a top electrode formed on the second passivation layer at a position corresponding to the bottom electrode to form a storage capacitance, wherein the bottom electrode is larger than the top electrode;
   a top substrate, positioned on a top side of the display device;
   a common electrode, formed on an under surface of the top substrate; and
   a liquid crystal layer, sandwiched by the top electrode and the common electrode, wherein a ratio of a total capacitance and a gate width of the pixel unit is larger than 150, wherein the total capacitance is sum of a liquid crystal layer capacitance and a storage capacitance of the pixel unit, and wherein a flicker level of the display device is less than −40 dB.

15. The display device of claim 14, wherein an edge of the bottom electrode is closer to the data line as compared to an edge of the top electrode to the data line.

* * * * *